US006049142A

United States Patent [19]

Wakefield

[11] Patent Number: 6,049,142

[45] Date of Patent: Apr. 11, 2000

[54] VOLTAGE ADAPTING SYSTEM AND METHOD USING MODULAR ADAPTER PLUGS

[75] Inventor: Ivan Nelson Wakefield, Cary, N.C.

[73] Assignee: Ericsson Inc., Research Triangle Park, N.C.

[21] Appl. No.: 08/996,416

[22] Filed: Dec. 22, 1997

[51] Int. Cl.[7] .......... H02J 1/00

[52] U.S. Cl. .......... 307/75

[58] Field of Search .......... 363/142, 143, 363/146; 307/73–75, 112, 72, 42

[56] References Cited

U.S. PATENT DOCUMENTS

| | | | |
|---|---|---|---|
| 4,131,805 | 12/1978 | Austin et al. | 307/147 |
| 4,386,333 | 5/1983 | Dillan | 336/107 |
| 5,159,545 | 10/1992 | Lee . | |

FOREIGN PATENT DOCUMENTS

| | | |
|---|---|---|
| 0712200 | 10/1992 | European Pat. Off. . |
| 1390669 | 6/1965 | France . |
| 19704130 | 8/1997 | Germany . |

*Primary Examiner*—Richard T. Elms
*Attorney, Agent, or Firm*—Wood, Phillips, VanSanten, Clark & Mortimer

[57] ABSTRACT

An adapter including: a receiver for receiving first and second voltages as an input; a conversion circuit; and first and second connectors on the receiver. The first connector can be releasably coupled to the conversion circuit in a first manner so that the conversion circuit generates a predetermined output voltage with the first input voltage supplied to the receiver. The second connector can also be releasably coupled to the conversion circuit in a second manner so that the conversion circuit generates an output voltage that is substantially the same as the predetermined output voltage with the second input voltage supplied to the receiver.

27 Claims, 2 Drawing Sheets

VOLTAGE ADAPTING SYSTEM AND METHOD USING MODULAR ADAPTER PLUGS

FIELD OF THE INVENTION

The present invention is directed to an adapter system and, in particular, to an adapter system and method for generating a predetermined output voltage that is independent of the input voltage from a power source.

BACKGROUND OF THE INVENTION

Different countries around the world have power sources that generate voltages of different magnitudes. For example, in many European countries standard power sources output 200 AC volts at a frequency of 50 hertz, while in the United States standard power sources generate 110 AC volts at a frequency of 60 hertz.

Electrical equipment is generally designed to operate at specific voltage ranges that are compatible with standard power sources that generate particular AC voltages. In order to use the same piece of electrical equipment with a voltage source generating a different voltage value, an adapter must be used to ensure that the voltage generated by the voltage source is adapted to a voltage magnitude that can be used by the equipment. The use of an adapter enables electrical equipment with specific voltage specifications to be used worldwide.

Adapters are electrical devices that accept a specific voltage as sm input and generate a predetermined output voltage. For example, a device may be designed to operate at 110 AC volts. This same device can be driven from a power source that generates 200 AC volts if an adapter that converts 200 AC volts to 110 AC volts is connected between the power source and the device.

Prior art adapters have used transformers with multiple voltage taps where the appropriate taps have been hard wired to generate a particular output voltage in response to a specific AC input voltage to the transformer. These adapters are tailor made to operate with a specific input voltage value to the transformer generating a predetermined output voltage. This requires the use of multiple adapters with different adapter plug configurations for power sources with different voltage values.

Many adapters have transformers with multiple taps and multiple modular adapter plugs designed to operate with different power sources generating different AC voltage values. Configuring the transformer to operate with a compatible power source generally involves two steps: using a switch to select the appropriate transformer taps, and selecting the appropriate modular adapter plug that is compatible with the power source being used.

Clearly it would be desirable to use a transformer where a single step could be performed to both select the appropriate transformer taps and configure the transformer to be physically compatible with the power source to be used. This would reduce the possibility of human error and potential damage to often expensive electrical equipment.

SUMMARY OF THE INVENTION

One embodiment of the invention is directed to an adapter including: a receiver for receiving first and second voltages as an input; a conversion circuit; and first and second connectors on the receiver. The first connector can be releasably coupled to the conversion circuit in a first manner so that the conversion circuit generates a predetermined output voltage with the first input voltage supplied to the receiver. The second connector can also be releasably coupled to the conversion circuit in a second manner so that the conversion circuit generates an output voltage that is substantially the same as the predetermined output voltage with the second input voltage supplied to the receiver.

The conversion circuit can include a transformer that is connected to the receiver for selectively receiving the first and second input voltages and generating the predetermined output voltage. The transformer may have first and second windings where the first winding has first, second and third taps. With the first connector coupled to the first and second taps, the first connector is coupled to the conversion circuit in the first manner and with the second connector coupled to the first and third taps, the second connector is coupled to the conversion circuit in the second manner.

The conversion circuit may include a rectification circuit that is coupled to the transformer for converting an AC input voltage to the receiver to a DC output voltage generated by the conversion circuit.

The receiver may have a casing containing the conversion circuit. In one form of the invention, with the first connector releasably mechanically connected to the casing at a first location, the first connector is coupled to the conversion circuit in the first manner and with the second connector releasably mechanically connected to the casing at the same first location, the second connector is coupled to the conversion circuit in the second manner. The casing can include a connection element that allows the first and second connectors to releasably and interchangeably connect to the casing at the first location. The first and second connectors may be configured to releasably electrically couple to sources for the first and second input voltages, respectively.

The conversion circuit may include a switch with an operating element that is movable between first and second positions such that with the operating element is in the first position, the conversion circuit causes a first input voltage to the receiver to produce an output voltage of a first magnitude from the conversion circuit and with the operating element in the second position, the conversion circuit causes the same first input voltage to the receiver to produce an output voltage of a second magnitude that is different than the first magnitude from the conversion circuit. The first connector may include an actuator element that causes the operating element to move from the first position into the second position as an incident of the first connector being coupled to the conversion circuit. The actuator on the first connector engages the operating element through a passageway on the receiver.

The transformer may include primary and secondary windings where the secondary winding has first, second and third taps. With the operating element in the first position and the first input voltage supplied to the receiver, the predetermined output voltage is generated across the first and second taps and with the operating element in the second position with the second input voltage being supplied to the receiver, the predetermined output voltage is generated across the first and third taps.

A first connector with the actuator and a second connector may tie provided. The first connector is capable of releasably mechanically connecting to the casing at the first location so that as an incident of connecting the first connector to the casing, the actuator engages and moves the operating element from the first position into the second position. The second connector is capable of releasably mechanically connecting to the casing at the same first location with the operating element in the first position but without causing the operating element to move into the second position.

The invention also contemplates a method of generating a predetermined output voltage from first and second different input voltages. The method includes the steps of: providing an adapter system including a receiver for receiving first and second different input voltages, a conversion circuit within a casing, and first and second connectors; releasably coupling the first connector to the conversion circuit in a first manner with the first connector mechanically coupled to the casing to cause the conversion circuit to generate the predetermined output voltage with the first input voltage supplied to the receiver; disconnecting the first connector from the conversion circuit; and releasably coupling the second connector to the conversion circuit in a second manner with the second connector mechanically coupled to the casing to cause the conversion circuit to generate the predetermined output voltage with the second input voltage suprplied to the receiver.

The method of generating a predetermined output voltage from first and second different input voltages may further include the steps of: releasably mechanically connecting the first connector to the casing at a first location; separating the first connector from the casing; and releasably mechanically connecting the second connector to the casing at the first location in place of the first connector.

The step of providing an adapter system may further involve the steps of: providing a conversion circuit including a switch with an operating element that can be moved between first and second positions such that with the operating element in the first position with the first input voltage supplied to the receiver, the conversion circuit produces an output voltage of a first magnitude and with the operating element in the second position with the first input voltage supplied to the receiver, the conversion circuit produces an output voltage of a second magnitude that is different than the first magnitude; and providing a first connector with an actuator. In addition, the step of releasably coupling the first connector may involve the step of engaging the actuator with the operating switch to move the operating switch from the first position into the second position as an incident of the first connector being coupled to the conversion circuit.

The step of providing the adapter system may involve the step of providing a second connector that does not have an actuator to engage and move the operating switch with the switch in the first position and the second connector coupled to the conversion circuit.

The step of providing an adapter system may involve the step of providing a transformer on the receiver for selectively receiving the first and second input voltages and generating the predetermined output voltage.

The step of releasably coupling the first connector may involve the step of releasably coupling first and second taps of a first winding of the transformer to the first connector with the first connector coupled to the conversion circuit in the first manner. Similarly, the step of releasably coupling the second connector may involve the step of releasably coupling the first tap and a third tap of the first winding of the transformer to the second connector with the second connector coupled to the conversion circuit in the second manner.

The step of providing an adapter system may further include the step of providing a rectification circuit coupled to the transformer for converting an AC input voltage to the receiver to a DC output voltage from the conversion circuit.

The step of providing an adapter system may involve the steps of releasably mechanically connecting the first connector to the casing at a first location with the first connector coupled to the conversion circuit in the first manner and releasably mechanically connecting the second connector to the casing at the first location with the second connector coupled to the conversion circuit in the second manner and the first connector separated from the casing.

The method of generating a predetermined output voltage may further include the steps of releasably electrically coupling the first connector to a source for the first input voltage with the first connector coupled to the conversion circuit and releasably coupling the second connector to a source for the second input voltage with the second connector coupled to the conversion circuit.

The step of providing an adapter system may involve the step of providing primary and secondary windings in the transformer wherein the first, second and third taps are on the primary winding.

DETAILED DESCRIPTION OF THE PREFERRED EMBODIMENT

Figure 1:
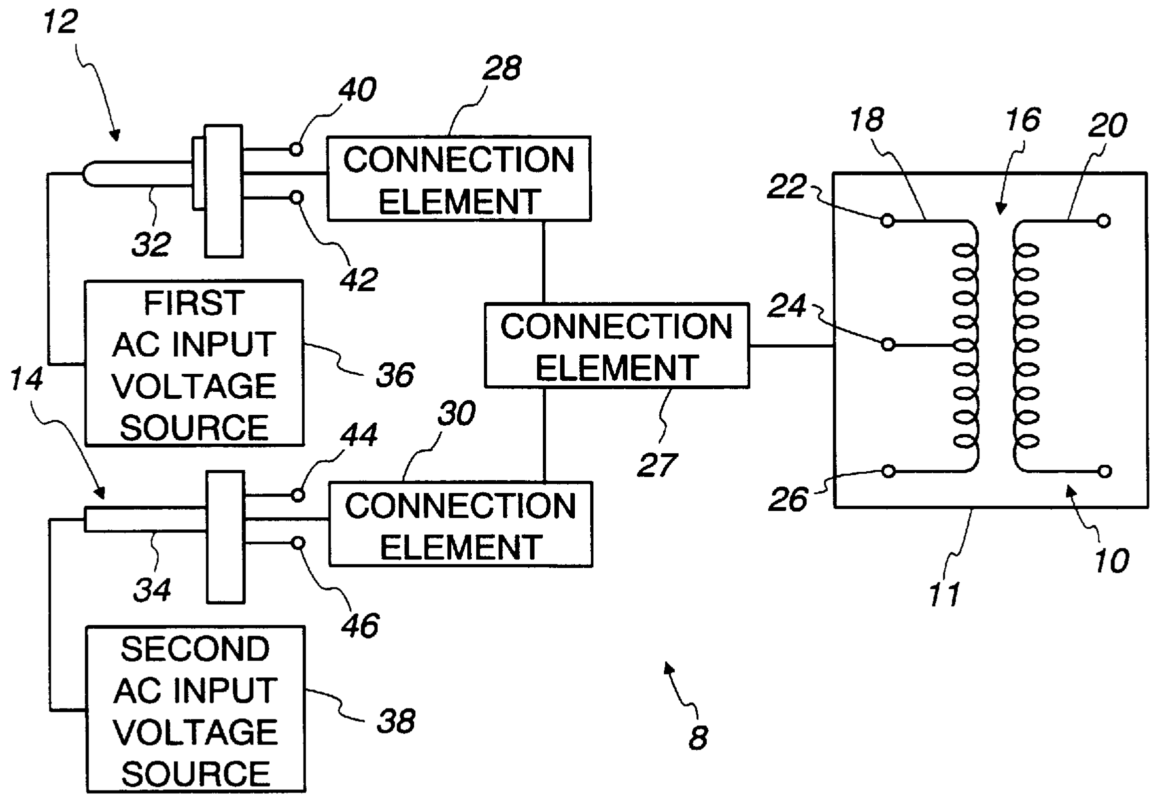
FIG. 1 is a schematic representation of an adapter system according to the present invention and including a conversion circuit and two connectors.

An exemplary embodiment of the adapter system, according to the invention, is shown at 8 in FIG. 1. The adapter system 8 includes a conversion circuit 10 within a casing 11 and at least two interchangeable connectors 12, 14 for appropriately configuring the conversion circuit 10 to accept AC input voltages having different magnitudes and to generate a predetermined AC output voltage.

The conversion circuit 10 is designed to have at least two settings: a first setting where the conversion circuit 10 accepts a first AC input voltage and generates the predetermined AC output voltage and a second setting where the conversion circuit 10 accepts a second AC input voltage that is different than the first AC input voltage and generates an output voltage that is substantially the same as the predetermined AC output voltage.

The conversion circuit 10 includes a transformer 16 that has a primary winding 18 and a secondary winding 20. The ratio between the number of windings on the primary winding 18 and the secondary winding 20 determines the ratio between the magnitudes of the AC input voltages and the AC output voltages generated by the transformer 16. The primary winding 18 has first, second and third taps 22, 24, 26. When the first AC input voltage is input across the first tap 22 and the second tap 24, the ratio between the number of windings between the first tap 22 and the second tap 24 of the primary winding 18 and the secondary winding 20 is such that the predetermined AC output voltage is generated across the secondary winding 20. Similarly, when the second AC input voltage is input across the first tap 22 and the third tap 26 of the primary winding 18, the ratio between the number of windings between the first tap 22 and the third tap 26 of The primary winding 18 and the secondary winding 20 is such that an output voltage substantially the same as the predetermined AC output voltage is generated across the secondary winding 20.

The casing 11, containing the conversion circuit 10, has a connection element 27 for interchangeably releasably mechanically connecting with connection elements 28, 30 on the two connectors 12, 14 to thereby releasably maintain the connectors 12, 14 on the casing 11 at a first location.

The first and second connectors 12, 14 have prongs 32, 34 that are configured to mate with the first and second AC input voltage sources 36, 38, respectively. For example, the first connector 12 can have prongs 32 that are configured for use in Europe for a 200 volt power source and the second connector 14 can have prongs 34 that are configured for use in the United States for a 110 volt power source.

The connectors 12, 14 are adapted to mate with the appropriate taps 22, 24, 26 on the primary winding 18 of the transformer 16. The first connector 12 has connection wires 40, 42 that are designed to electrically couple with the first tap 22 and the second tap 24 of the conversion circuit 10 in a first manner so that the first AC input voltage is received as the input voltage to the transformer 16. The predetermined AC output voltage is then generated across the secondary winding 20. Similarly, the second connector 14 has connection wires 44, 46 that are designed to electrically couple with the first tap 22 and the third tap 26 of the conversion circuit 10 in a second manner so that the second AC input voltage is received as the input voltage to the transformer 16. The AC output voltage generated across the secondary winding 20 is substantially the same as the predetermined AC output voltage. Thus, the adapter system can be used to generate the same predetermined AC output voltage for at least two different AC input voltage values.

The adaptor system can be designed to accommodate more than two different AC input voltages without departing from the spirit of the invention. The primary winding of the transformer can, for example, include six appropriately placed taps for accepting 100 AC volts, 120 AC volts, 230 AC volts, 240 AC volts, and 250 AC volts as input voltages and generating the predetermined AC output voltage across the secondary winding. The design in this example would require five interchangeable connectors having five different prong configurations for mating with the five different AC input voltage sources and having five different sets of connection wires for electrically coupling with the appropriate taps on the primary winding.

It should also be understood that the adapter system transformer is typically designed so that the number of taps used is equal to the number of different AC input voltages to be accommodated plus one. However, a transformer designed with a fewer or a greater number of taps are also within the scope of the invention.

Figure 2:
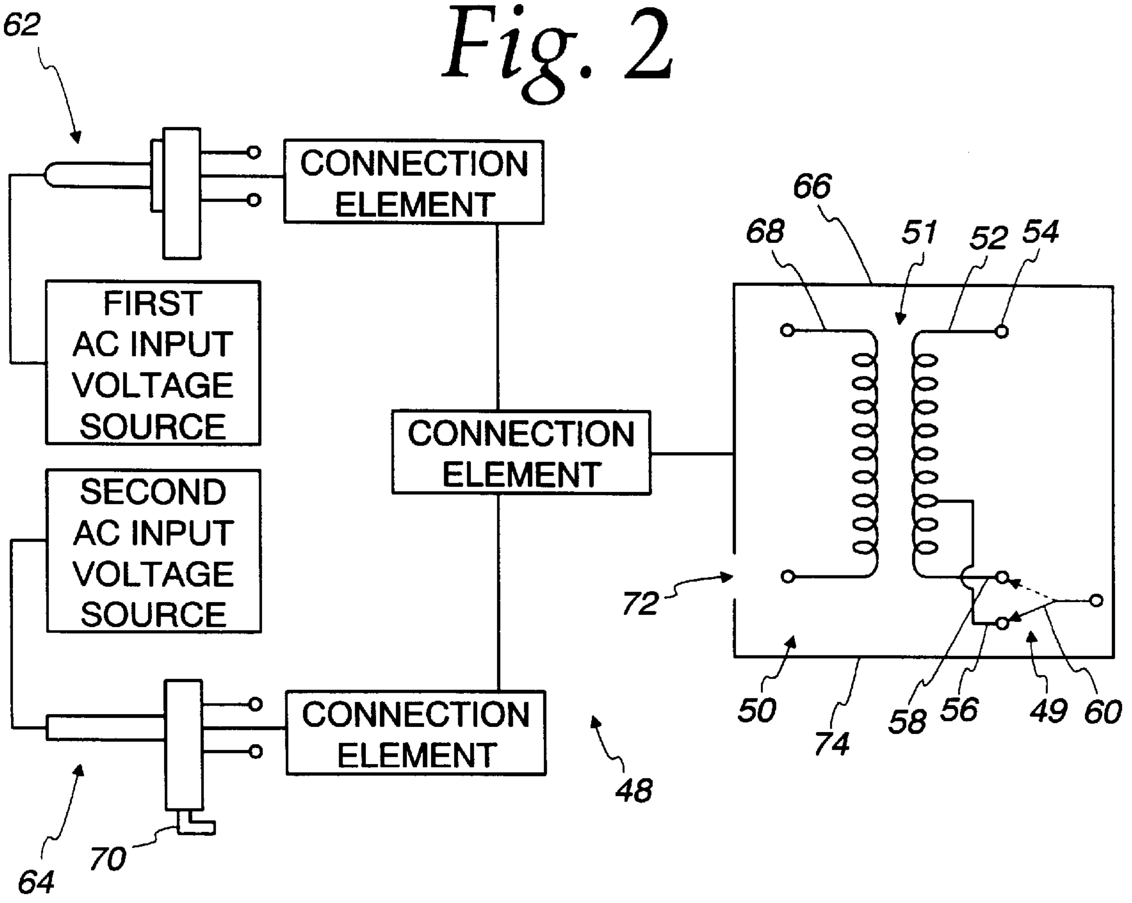
FIG. 2 is a schematic representation of a modified form of an adapter system according to the present invention.

A modified form of the adapter system, according to the present invention, is shown at 48 in FIG. 2. A switch 49 is used to configure the conversion circuit 50 to selectively receive one of at least two AC input voltages. The switch 49 configures the conversion circuit 50 by adjusting the winding ratio of the transformer 51 by modifying the number of windings on the secondary winding 52.

The secondary winding 52 has first, second and third taps 54, 56, 58. The switch 49 has an operating element 60 that is movable between a normally closed first position and a second position. With the operating element 60 in the normally closed first position, the operating element 60 is coupled to the second tap 56. In this configuration, the predetermined AC output voltage is generated across the first tap 54 and the second tap 56 with the first AC input voltage being supplied to the conversion circuit 50. With the operating element 60 in the second position, the operating element 60 is coupled to the third tap 58. The predetermined AC output voltage is generated across the first tap 54 and the third tap 58 with the second AC input voltage being supplied to the conversion circuit 50.

The first and second connectors 62, 64 are configured to cause the operating element 60 to be placed in the first and second positions, respectively. With the first connector 62 releasably mechanically connected to the casing 66 at the first location, the operating element 60 remains in the normally closed first position. The winding ratio between the primary winding 68 and the secondary winding 52 across the first tap 54 and the third tap 56 is such that th, predetermined AC output voltage is generated across these two taps 54, 56 with the first AC input voltage being supplied across the primary winding 68.

The second connector 64 is designed with a mechanical actuator 70. With the second connector 64 releasably mechanically connected to the casing 66 at the same first location, the actuator 70 moves through a passageway 72 in a casing 74 and engages and moves the operating element 60 from the normally closed first position into the second position. The winding ratio between the primary winding 68 and the secondary winding 52 across the first tap 54 and the third tap 58 is such that the predetermined AC output voltage is generated between these two taps 54, 58 with the second AC input voltage being supplied across the primary winding 68. It should be understood that the adapter system can be designed with a secondary winding 52 having more than three taps. The operating element 60 can be adapted to have more than two operating positions and multiple connectors with appropriate configurations can be used to enable the adapter system to generate the predetermined AC output voltage as a function of more than two different AC input voltages.

Figure 3:
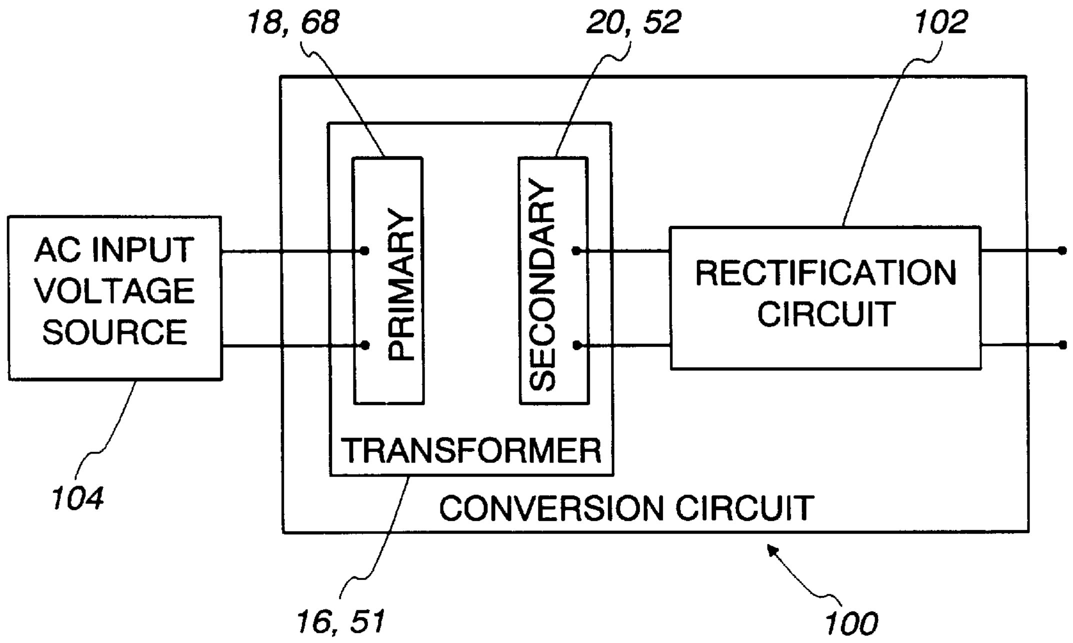
FIG. 3 is a schematic representation of another modified form of an adapter system according to the present invention, with a rectification circuit included in the conversion circuit.

Another modified form of the adapter system according to the present invention is shown at 100 in FIG. 3 with like elements in FIGS. 1 and 2 indicated with the same reference numbers. In this form of the invention, the transformer designs 16, 51 shown in FIG. 1 and FIG. 2 are adapted to include a rectification circuit 102 for converting the predetermined AC output voltage generated by the secondary winding 20, 52 into a relatively fixed DC output voltage with an AC input voltage being supplied to the primary winding 18, 68.

The AC input voltage source 104 is electrically coupled across; the primary winding 18, 68 of the transformer 16, 51 for supplying the AC input voltage. The rectification circuit 102 is conventionally coupled across the secondary winding 20, 52. The predetermined AC output voltage generated by the secondary winding 20, 52 of the transformer 16, 51 is received by the rectification circuit 102. The rectification circuit 102 converts the predetermined AC output voltage into the DC output voltage. In designing the adapter system, the winding ratio between the primary winding 18, 68 and the secondary winding 20, 52 of the transformer 16, 51 is calculated to generate the predetermined AC output voltage value required to generate the desired DC output voltage value.

The inventive adapter systems 8, 48 can be used in different countries having power sources that generate voltages of different magnitudes. Using the adapter system 8 as an example, the first connector 12 may be designed to be compatible with a 200 AC voltage source in Europe and the second connector 14 may be designed to be compatible with a 110 AC voltage source in the United States.

To use the adapter system 8 with the 200 AC voltage source, the first connector 12 is releasably mechanically connected to the casing 11 at the first location. This mechanical connection would also result in the first connector 12 releasably coupling with the conversion circuit 10 in the first manner such that the conversion circuit 10 would generate the predetermined AC output voltage with 200 AC volts being supplied as the AC input voltage to the conversion circuit 10.

In order to re-configure the adapter system 8 for use with 110 AC voltage source, the first connector 12 would first be disconnected from the conversion circuit 10 by separating the first connector 12 from the casing 11 at the first location. The second connector 14 would then be releasably mechanically connected to the casing 11 at the same first location. This mechanical connection would cause the second connector 14 to releasably couple with the conversion circuit 10 in the second manner such that the conversion circuit 10 would generate the predetermined AC output voltage with 110 AC volts being supplied as the AC input voltage to the conversion circuit 10.

The foregoing disclosure of specific embodiments is intended to be illustrative of the broad concepts comprehended by the invention.

I claim:

1. An adapter system comprising:

a receiver for first and second different input voltages;

a conversion circuit;

a first connector on the receiver which is capable of releasably coupling to the conversion circuit in a first manner to cause the conversion circuit to generate a predetermined output voltage with the first input voltage supplied to the receiver; and a second connector on the receiver which is capable of releasably coupling to the conversion circuit in a second manner different than the first manner to cause the conversion circuit to generate an output voltage that is substantially the same as the predetermined output voltage with the second input voltage supplied to the receiver.

2. The adapter system according to claim 1, wherein the conversion circuit comprises a transformer connected to the receiver for selectively receiving the first and the second input voltages and generating the predetermined output voltage.

3. The adapter system according to claim 2, wherein the transformer comprises a primary winding having first, second and third taps and a secondary winding, the first connector is coupled to the first and second taps with the first connector coupled in the first manner and the second connector is coupled to the first and third taps with the second connector coupled in the second manner.

4. The adapter system according to claim 2, wherein the conversion circuit comprises a rectification circuit coupled to the transformer for converting an AC input voltage to the receiver to a DC output voltage from the conversion circuit.

5. The adapter system according to claim 1, wherein the receiver comprises a casing in which the conversion circuit is contained.

6. The adapter system according to claim 5, wherein the first connector is releasably mechanically connected to the casing at a first location with the first connector coupled to the conversion circuit in the first manner and the second connector is releasably mechanically connected to the casing at the first location with the second connector coupled to the conversion circuit in the second manner.

7. The adapter system according to claim 6 wherein the casing comprises a connection element which releasably connects interchangeably with the first and second connectors at the first location.

8. The adapter circuit according to claim 1, wherein the first connector is configured to releasably electrically couple to a source for the first input voltage and the second connector is configured to releasably electrically couple to a source for the second input voltage.

9. The adapter system according to claim 1 wherein the conversion circuit comprises a switch with an operating element that is movable between first and second positions, with the operating element in the first position the conversion circuit causes a first input voltage to the receiver to produce an output voltage from the conversion circuit of a first magnitude, and with the operating element in the second position the conversion circuit causes the second input voltage to the receiver to produce an output voltage from the conversion circuit of substantially the same magnitude as the first magnitude, and at least one of the first or second connectors comprises an actuator element which engages the operating element and causes the operating element to move from the second position into the first position or the first position into the second position, respectively, as an incident of the first or second connector, respectively, being coupled to the conversion circuit.

10. An adapter system comprising:

a receiver for an input voltage; and a conversion circuit for generating an output voltage as an incident of the input voltage being supplied to the receiver, said conversion circuit comprising a switch with an operating element that is movable between first and second positions, the conversion circuit causing a first input voltage to the receiver to produce an output voltage from the conversion circuit of a first magnitude with the operating element in the first position, the conversion circuit causing the first input voltage to the receiver to produce an output voltage from the conversion circuit of a second magnitude that is dilferent than the first magnitude with the operating element in the second position, said receiver comprising a casing for the conversion circuit, there being a connecting location on the receiver at which a connector can be coupled to the conversion circuit to supply an input voltage to the conversion circuit, there further being a passageway on the receiver to allow an actuator on a connector to engage the operating element and move the operating element from the first position into the second position as an incident of the connector being coupled to the conversion circuit.

11. The adapter system according to claim 10, wherein the conversion circuit comprises a transformer connected to the receiver for selectively receiving a) the first input voltage and b) a second input voltage that is different than the first input voltage and generating a predetermined output voltage.

12. The adapter system according to claim 11 wherein the transformer comprises a secondary winding having first, second and third taps and a primary winding, the predetermined output voltage is generated across the first and second taps with the operating element in the first position with the first input voltage being supplied to the receiver, and the predetermined output voltage is generated across the first and third taps with the operating element in the second position with the second input voltage being supplied to the receiver.

13. The adapter system according to claim 11, wherein the conversion circuit comprises a rectification circuit coupled to the transformer for converting an AC input voltage to the receiver to a DC output voltage from the conversion circuit.

14. The adapter system according to claim 10, wherein the receiver comprises a casing in which the conversion circuit is contained.

15. The adapter system according to claim 14 further comprising a first connector with an actuator and a second connector, wherein the first connector is capable of releasably mechanically connecting to the casing at a first location as an incident of which the actuator engages and moves the operating element from the first position into the second position and the second connector is capable of releasably mechanically connecting to the casing at the first location with the operating element in the first position without causing the operating element to move into the second position.

16. The adapter system according to claim 15, wherein the casing comprises a connection element which releasably connects interchangeably with the first and second connectors at the first location.

17. The adapter circuit according to claim 15, wherein the first connector is configured to be releasably electrically coupled to a source for the first input voltage to supply the first input voltage to the receiver and the second connector is configured to be releasably electrically coupled with a source for the second input voltage that is different than the first input voltage to supply the first input voltage to the receiver.

18. A method of generating a predetermined output voltage from first and second different input voltages, said method comprising the steps of:

providing an adapter system comprising a receiver for first and second different input voltages, a conversion circuit within a casing, and first and second connectors;

releasably coupling the first connector to the conversion circuit in a first manner with the first connector mechanically coupled to the casing to cause the conversion circuit to generate the predetermined output voltage with the first input voltage supplied to the receiver;

disconnecting the first connector from the conversion circuit; and releasably coupling the second connector to the conversion circuit in a second manner different than the first manner with the second connector mechanically coupled to the casing to cause the conversion circuit to generate the predetermined output voltage with the second input voltage supplied to the receiver.

19. The method of generating a predetermined output voltage according to claim 18 further including the steps of releasably mechanically connecting the first connector to the casing at a first location, separating the first connector from the casing, and releasably mechanically connecting the second connector to the casing at the first location in place of the first connector.

20. The method of generating a predetermined output voltage according to claim 18 wherein the step of providing an adapter system comprises the steps of a) providing a conversion circuit comprising a switch with an operating element that is movable between first and second positions such that with the operating element in the first position the conversion circuit causes the first input voltage to the receiver to produce an output voltage from the conversion circuit of a first magnitude and with the operating element in the second position the conversion circuit causes the second input voltage to the receiver to produce an output voltage from the conversion circuit of substantially the same magnitude as the first magnitude and b) providing a first connector comprising an actuator, and the step of releasably coupling the first connector comprises the step of engaging the actuator with the operating switch to move the operating switch from the first position into the second position as an incident of the first connector being coupled to the conversion circuit.

21. The method of generating a predetermined output voltage according to claim 20 wherein the step of providing the adapter system comprises the step of providing a second connector having no actuator to engage and move the operating switch with the switch in the first position as an incident of the second connector being coupled to the conversion circuit.

22. The method of generating a predetermined output voltage according to claim 18, wherein the step of providing an adapter system comprises the step of providing a transformer on the receiver for selectively receiving the first and second input voltages and generating the predetermined output voltage.

23. The method of generating a predetermined output voltage according to claim 22, wherein the step of providing an adapter system comprises the step of providing a rectification circuit coupled to the transformer for converting an AC input voltage to the receiver to a DC output voltage from the conversion circuit.

24. The method of generating a predetermined output voltage according to claim 18 wherein the step of releasably coupling the first connector comprises the step of releasably coupling first and second taps of a first winding of the transformer to the first connector with the first connector coupled in the first manner and the step of releasably coupling the second connector comprises the step of releasably coupling the first tap and a third tap of the first winding of the transformer to the second connector with the second connector coupled in the second manner.

25. The method of generating a predetermined output voltage according to claim 24, wherein the step of providing an adapter system comprises the step of providing primary and secondary windings in the transformer wherein the first, second and third taps are on the primary winding.

26. The method of generating a predetermined output voltage according to claim 18 wherein the step of providing an adapter system comprises the steps of releasably mechanically connecting the first connector to the casing at a first location with the first connector coupled to the conversion circuit in the first manner and releasably mechanically connecting the second connector to the casing at the first location with the second connector coupled to the conversion circuit in the second manner and the first connector separated from the casing.

27. The method of generating a predetermined output voltage according to claim 18 further including the steps of releasably electrically coupling the first connector to a source for the first input voltage with the first connector coupled to the conversion circuit and releasably coupling the second connector to a source for the second input voltage with the second connector coupled to the conversion circuit.

* * * * *